United States Patent
Uhlmeyer

[19]
[11] Patent Number: 5,950,366
[45] Date of Patent: Sep. 14, 1999

[54] SEAL STRUCTURE FOR REMOVABLE ROOF

[75] Inventor: Michael Robert Uhlmeyer, Royal Oak, Mich.

[73] Assignee: General Motors Corporation, Detroit, Mich.

[21] Appl. No.: 08/843,740

[22] Filed: Apr. 21, 1997

[51] Int. Cl.⁶ .................................................. B60J 10/12
[52] U.S. Cl. ...................... 49/484.1; 49/492.1; 49/498.1; 296/218; 296/93; 296/213; 296/216.07
[58] Field of Search ................................. 296/93, 107.4, 296/121, 213, 218, 216.06, 216.07; 49/484.1, 492.1, 495.1, 498.1

[56] References Cited

U.S. PATENT DOCUMENTS

| | | | |
|---|---|---|---|
| 2,899,721 | 8/1959 | Herman | 49/498.1 |
| 2,988,788 | 6/1961 | Saponara | 49/492.1 |
| 3,106,422 | 10/1963 | White. | |
| 4,232,081 | 11/1980 | Pullan | 49/498.1 |
| 4,653,801 | 3/1987 | Shirasu et al. | 296/93 |
| 4,703,973 | 11/1987 | Fujikawa | 296/201 |
| 4,708,351 | 11/1987 | Midooka et al. | 296/93 X |
| 4,787,668 | 11/1988 | Kawase et al. | 296/93 |
| 4,830,425 | 5/1989 | Muscat | 296/121 |
| 4,962,960 | 10/1990 | Wurl et al. | 296/121 |
| 5,029,931 | 7/1991 | Asaba et al. | 296/93 |
| 5,178,919 | 1/1993 | Mimura et al. | 296/93 X |
| 5,331,768 | 7/1994 | Takeuchi | 49/493.1 |
| 5,342,107 | 8/1994 | Saji et al. | 296/210 |
| 5,346,273 | 9/1994 | Takeuchi | 296/146.9 |
| 5,347,758 | 9/1994 | Yamane | 49/484.1 |
| 5,352,009 | 10/1994 | Takeuchi | 296/146.9 |
| 5,356,194 | 10/1994 | Takeuchi | 296/146.9 |
| 5,360,251 | 11/1994 | Watanabe et al. | 296/93 |
| 5,367,831 | 11/1994 | Gunkel | 49/478.1 |
| 5,369,914 | 12/1994 | Takeuchi | 49/495.1 |
| 5,377,449 | 1/1995 | Hineribara et al. | 49/441 |
| 5,462,292 | 10/1995 | Yamane | 49/484.1 |
| 5,466,508 | 11/1995 | Brocke et al. | 296/93 X |
| 5,492,387 | 2/1996 | Yada et al. | 296/93 |

FOREIGN PATENT DOCUMENTS 403284440 12/1991 Japan ..................................... 296/93

*Primary Examiner*—Dennis H. Pedder
*Attorney, Agent, or Firm*—Charles E. Leahy; Kathryn A. Marra

[57] ABSTRACT

A seal structure is provided for a vehicle having a removable roof member. Advantageously, the single integral seal structure seals between a front end of the roof member, an upper edge of a windshield, and a header rail. The seal structure includes a base retainer portion secured to the header rail and a windshield lip portion covering and sealing against the upper edge of the windshield. The windshield lip portion is integrally coupled to the base retainer portion. The seal structure also includes a weatherstrip portion integrally coupled with the windshield lip portion and the base retainer portion for sealably engaging the front end of the roof member. Preferably, the weatherstrip portion includes at least one hollow weatherstrip bulb for sealably engaging the forward end of the roof member. Also preferably, a living hinge portion hingedly couples the weatherstrip portion to the windshield lip portion at the intersection with the base retainer portion such that the weatherstrip portion is rotatable about the living hinge portion for ease of assembly.

12 Claims, 4 Drawing Sheets

SEAL STRUCTURE FOR REMOVABLE ROOF

This invention relates to a seal structure for providing a seal between a windshield, a vehicle header rail and a removable vehicle roof member.

BACKGROUND OF THE INVENTION

It is well known to provide hardtop vehicles which have removable roof configurations such as targa tops or convertibles. It is also known to provide a sealing arrangement along the junction of an upper rear edge of the windshield glass, a header rail and a front end of a removable roof member.

FIGS. 4–6 show an example of a typical prior art sealing arrangement for this portion of the vehicle. The prior art sealing arrangement includes three distinct components to provide sealing between a rear upper edge of a windshield glass 10, a header rail 11 and a front end of a removable roof member 12. These components include a windshield reveal molding 13, a header weatherstrip retainer 14 and a header weatherstrip 15. As best shown in FIG. 4, the windshield reveal molding 13 is preferably a rolled formed metal component, preferably made of aluminum. The generally U-shaped header weatherstrip retainer 14 is also preferably a roll formed metal component, preferably made from stainless steel. As shown in FIG. 4, the windshield reveal molding 13 and the header weatherstrip retainer 14 are assembled together, such as by rivets 16, to form a subassembly 17. As best shown in FIG. 5, the subassembly 17 is then connected to an upper windshield frame portion 18 of the header rail 11, such as by screws 19. As shown in FIG. 6 in the assembled condition, a forward edge of the windshield reveal molding 13 rests on the rear upper edge of the windshield glass 10. Referring to FIG. 6, the header weatherstrip 15 is preferably a rubber component which is either molded or extruded. It will be appreciated that the header weatherstrip 15 is adhesively bonded to the header weatherstrip retainer 14 in a separate assembly step. When the removable roof member 12 is mounted on the vehicle as shown in FIG. 6, the forward edge of the removable roof member 12 seals to the header weatherstrip 15 to provide a quiet and dry passenger compartment.

However, the prior art design has the shortcoming of requiring three distinct components which require subassembly and are relatively labor intensive to install. In addition, the use of three components for sealing can create potential leak paths between the three components, especially between the separate header weatherstrip 15 and windshield reveal molding 13. Also, the use of three components, two of which are preferably made of rolled metal, provides a relatively heavy sealing arrangement.

SUMMARY OF THE INVENTION

The present invention offers advantages and alternatives over the prior art. Advantageously, the invention preferably provides a windshield, roof, and header seal structure for a vehicle with a removable roof member. Advantageously, this invention combines the distinct functions of the windshield reveal molding, the header weatherstrip retainer and the header weatherstrip into a single component. Advantageously, the seal structure is preferably handled as a single component during assembly and does not require any subassembly, thus eliminating adhesives and mechanical fasteners. In addition, the seal structure of the present invention is relatively lightweight and easy to install on the vehicle. Also advantageously, the seal structure is provided as a single integral component such that potential leak paths between multiple components are eliminated.

These and other advantages are accomplished by providing a seal structure for a vehicle having a removable roof member. The seal structure seals between a front end of the roof member, an upper edge of a windshield, and a header rail. The seal structure includes a base retainer portion secured to the header rail and a windshield lip portion covering and sealing against the upper edge of the windshield. The windshield lip portion is integrally coupled to the base retainer portion. The seal structure also includes a weatherstrip portion integrally coupled with the windshield lip portion and the base retainer portion for sealably engaging the front end of the roof member.

Preferably, a living hinge portion hingedly couples the weatherstrip portion to the windshield lip portion at the intersection with the base retainer portion such that the weatherstrip portion is rotatable about the living hinge portion. Also preferably, the base retainer portion includes a generally upwardly projecting hook portion integrally formed therewith and the weatherstrip portion includes a finger portion for matably engaging the hook portion by snap-fitted engagement to hold the weatherstrip in position relative to the base retainer portion.

In accordance with other preferred aspects of the invention, the weatherstrip portion includes at least one hollow weatherstrip bulb for sealably engaging the forward end of the roof member. Most preferably, the weatherstrip portion includes a hollow front weatherstrip bulb and a hollow rear weatherstrip bulb for sealably engaging the forward end of the roof member and providing primary and secondary seals, respectively, against the roof member. The weatherstrip portion preferably includes an arm portion extending between and integrally connecting the front and rear weatherstrip bulbs. Preferably, the finger portion is integrally coupled to the arm portion. Also preferably, the arm portion is made of a first material and the bulbs are substantially made from a second material.

In another preferred form of the invention, a core member extends through and is integrally embedded in the base retainer portion and the windshield lip portion. The weatherstrip portion includes an arm portion extending between and integrally connecting the front and rear weatherstrip bulbs. The arm portion, windshield lip portion and base retainer portion are made of a first material, the bulbs are substantially made from a second material, and the core member is made from a third material. Preferably, the third material is stiffer than the second material and the second material is stiffer than the first material.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
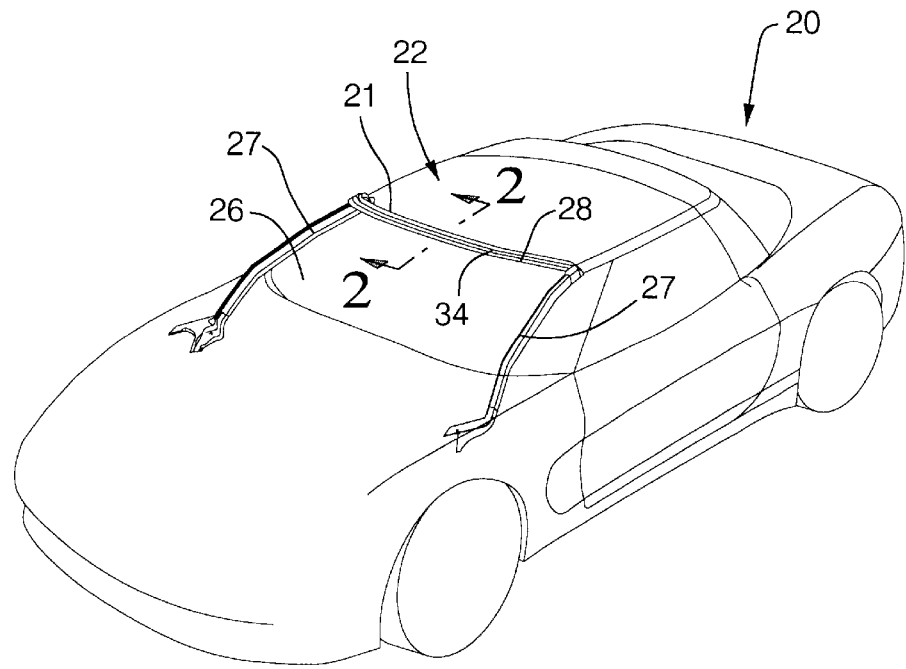
FIG. 1 is an overall perspective view of a vehicle and showing generally the location of a windshield, roof, and header seal structure along an upper edge of a windshield.
Figure 2:
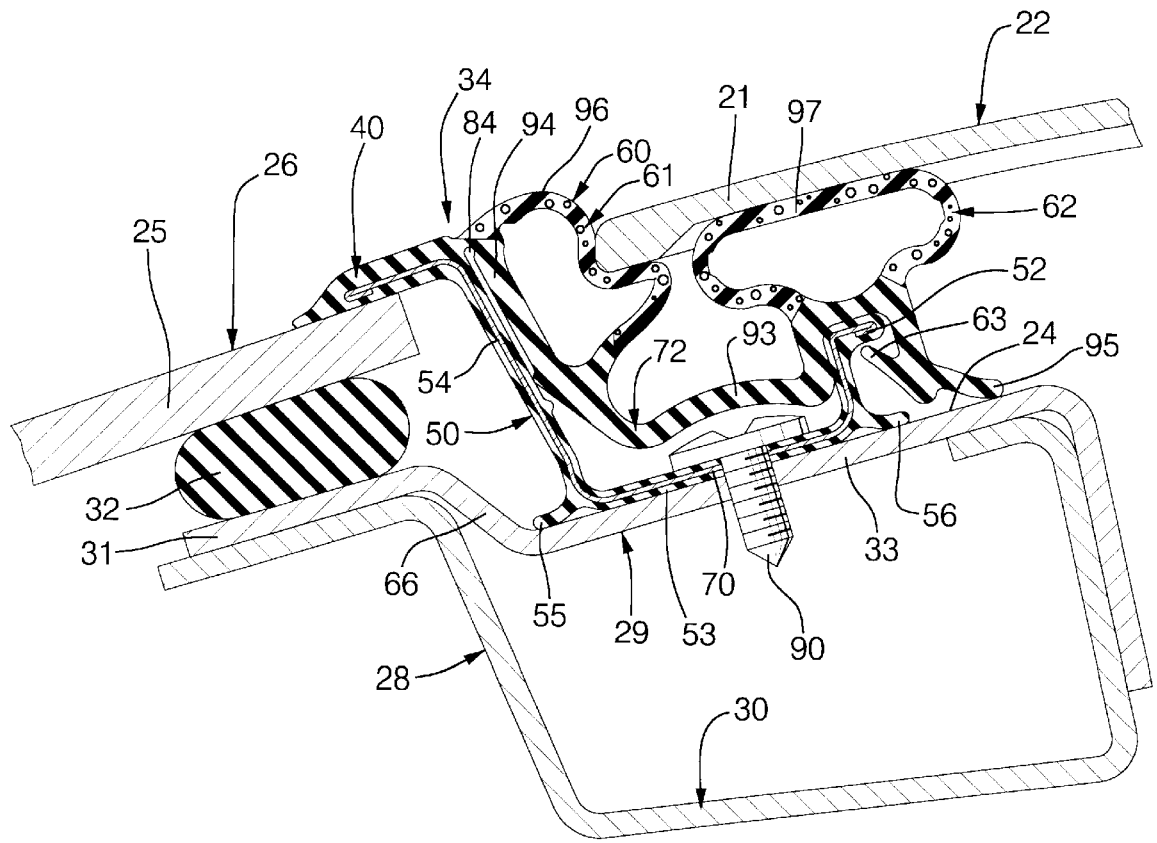
FIG. 2 is a cross-sectional view taken along line 2—2 of FIG. 1 and showing the seal structure in the fully assembled condition with a removable roof member installed on the vehicle.

FIG. 1 shows a vehicle 20 which is a hardtop vehicle 20 having a removable or openable roof member 22 including a front end 21. The vehicle 20 includes a windshield 26, preferably made of glass, and having an upper edge 25. The vehicle 20 also includes A-pillar rails 27 located on opposing sides of the windshield 26. Referring to FIGS. 1 and 2, a header rail 28 extends laterally between the top ends of the A-pillar rails 27 beneath the upper edge 25 of the windshield 26 and the front end 21 of the roof member 22. The A-pillar and header rails 27, 28 provide structural support to the upper front end of the vehicle 20. While a single removable roof member 22 is shown, it will be appreciated that more than one removable roof member 22 may be provided. The front end 21 of the roof member 22 sealably engages a windshield, roof, and header seal structure 34 when the roof member 22 is installed on the vehicle 20, as described further hereinafter.

As best shown in FIG. 2, the header rail 28 includes an upper rail portion 29 and a generally U-shaped lower rail portion 30. The upper and lower rail portions 29, 30 are preferably made of stamped metal and suitably joined together, such as by welding. However, it will also be appreciated that the upper and lower rail portions 29, 30 may also be formed as a single integral component or could be made of more than two pieces suitably joined together to provide the header rail 28. The upper rail portion 29 of the header rail 28 preferably includes an base portion 33 having an upper surface 24 and a flange portion 31 extending forwardly from the base portion 33 and for supporting the upper edge 25 of the windshield 26. The upper rail portion 29 also preferably includes a stepped portion 66 extending between the base portion 33 and the flange portion 31 such that the flange portion 31 is positioned slightly upward from the base portion 33. The upper edge 25 of the windshield 26 is seated on the flange portion 31 of the header rail 28 and is suitably joined thereto, such as by an adhesive bead 32.

The windshield, roof and header seal structure 34 is preferably formed as a single integral component. The seal structure 34 includes a windshield lip portion 40, a base retainer portion 50, and a weatherstrip portion 60. The seal structure 34 also includes a core member 70 which serves as a substrate for the windshield lip portion 40 and the base retainer portion 50, as described further hereinafter.

Figure 3A:
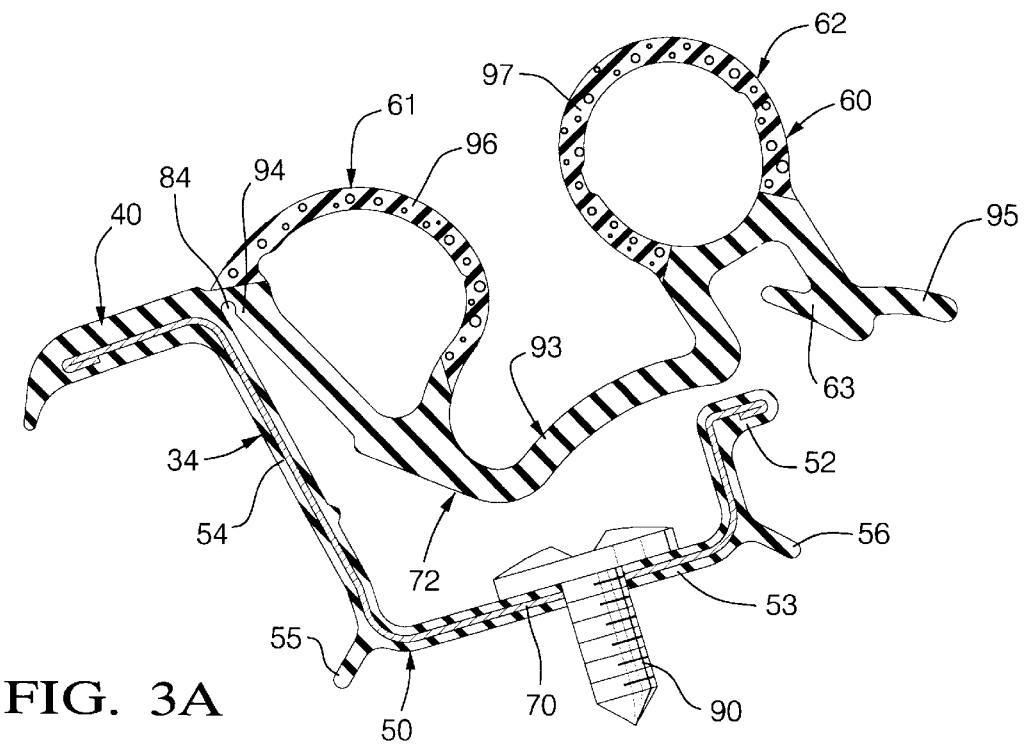
FIG. 3A is a cross-sectional view similar to FIG. 2, but showing the seal structure in a partially assembled condition.

The base retainer portion 50 is generally L-shaped and is preferably integrally formed with the seal structure 34. As best shown in FIG. 3A, the base retainer portion 50 includes a generally horizontal lower leg portion 53 which is suitable secured to the base portion 33 of the upper rail portion 29 of the header rail 28, such as by screws 90 spaced apart along the length of the base retainer portion 50. The base retainer portion 50 also includes a side leg portion 54 which extends generally upward from a front edge of the lower leg portion 53 and is integrally connected thereto. The base retainer portion 50 further includes a hook portion 52 extending generally upwardly from a rear edge of the lower leg portion 53 for retaining the weatherstrip portion 60, as described further hereinafter. The hook portion 52 is also integrally formed with the base retainer portion 50. The base retainer portion 50 may also include a forward lip portion 55 extending generally downward and forward from the forward edge of the lower leg portion 52 and for elastically engaging the upper surface 24 of the header rail 28 and a rearward lip portion 56 extending generally downward and rearward from the rearward edge of the lower leg portion 53 and for elastically engaging the upper surface 24 of the header rail 28.

The windshield lip portion 40 is a generally forwardly extending lip portion which covers and sealably engages the upper edge 25 of the windshield 26. The windshield lip portion 40 is integrally coupled to the base retainer portion 50 at an upper end of the side leg portion 54.

A core member 70 extends through and is integrally embedded in the base retainer portion 50 and the windshield lip portion 40 and serves as a substrate for adding stiffness to these components. The core member 70 is encapsulated in an outer layer of base material 72 which forms the remainder of the base retainer portion 50 and the windshield lip portion 40 and also forms part of the weatherstrip portion 60 of the seal structure 34, as described further hereinafter. The base material 72 is preferably a dense rubber material having a durometer of approximately 65–75. The core member 70 is preferably made of a material which is stiffer than the base material 72. The core member 70 is preferably made of a metal, such as stainless steel. The core member 70 may preferably be roll formed to shape and then integrally extruded with the base material 72. It will also be appreciated that the core member 70 may be made of any suitable material, such as a plastic or composite, which is preferably stiffer then the base material 72 for adding structural support to the base retainer portion 50 and windshield lip portion 40 of the seal structure 34.

The weatherstrip portion 60 is integrally coupled to the windshield lip portion 40 and the base retainer portion 50 and sealably engages the front end 21 of the roof member 22. The weatherstrip portion 60 includes a hollow front weatherstrip bulb 61 and a hollow rear weatherstrip bulb 62. As best shown in FIG. 2, the front weatherstrip bulb 61 sealably engages the front end 21 of the roof member 22 to act as a primary seal for preventing wind and water leakage into the interior of the vehicle 20. In addition, the rear weatherstrip bulb 62 also sealably engages the front end 21 of the roof member 22 to provide an additional secondary seal to prevent wind and water leakage into the interior of the vehicle 20. In addition, the weatherstrip portion 60 is also integrally connected to the intersection of the base retainer portion 50 and the windshield lip portion 40 such that no leak paths are available for wind and water between the weatherstrip portion 60 and the windshield lip portion 40. Advantageously, this seal structure 34 provides a quiet and dry vehicle interior by the use of a single, relatively easy to assemble integrally formed part.

The weatherstrip portion 60 also includes a lower arm portion 93 which integrally connects the front and rear weatherstrip bulbs 61, 62 together. It will be appreciated that the front and rear weatherstrip bulbs 61, 62 are preferably spaced longitudinally spaced apart, but are integrally joined by the lower arms portion 93. In addition, the lower arm portion 93 is generally L-shaped and closes out and forms the lower ends of the front and rear weatherstrip bulbs 61, 62. The arm portion 93 further includes a retaining finger portion 63 integrally extending from the forward end of the arm portion 93 of the weatherstrip portion 60. The finger portion 63 is positioned for snap-fitted engagement with the hook portion 52 of the base retainer portion 50 to hold the weatherstrip portion 60 in position relative to the base retainer portion 50, as described further hereinafter. The arm portion 93 may also include a rear lip portion 95 for engaging the upper surface 24 of the upper rail portion 29 on a bottom side. An upper side of the rear lip portion 95 may also be used to elastically engage a mating interior trim molding (not shown) side to prevent rattles and provide a better fit with the molding.

In addition, the arm portion 93 includes a forward tip portion 94 located on the forwardmost and uppermost corner of the arm portion 93 which is integrally connected to a living hinge portion 84. As best shown in FIG. 3A, the living hinge portion 84 is a thinned portion located at the intersection of the rear end of the windshield lip portion 40, the upper end of the side leg portion 54 of the base retainer portion 50 and the forward tip portion 94 of the arm portion 93 of the weatherstrip portion 60. The entire weatherstrip portion 60 including the front and rear weatherstrip bulbs 61, 62, and the arm portion 93 are rotatable about the living hinge portion 84 for easier attachment of the base retainer portion 50 to the header rail 28, as described further below.

The arm portion 93 of the weatherstrip portion 60 is also preferably a continuation of the base material 72 being the dense rubber material. However, the upper, generally U-shaped bodies 96, 97 of the front and rear weatherstrip bulbs 61, 62 are preferably made of a different material which is preferably a more flexible sponge rubber material. Thus, it will be appreciated that the weatherstrip portion 60 is made of two materials. The arm portion 93 including the finger portion 63 being made of the stiffer base material 72 and the upper bodies 96, 97 of the bulbs 61, 62 preferably being made of the more elastic, flexible sponge rubber material. Preferably, the upper bulb material and the base material 72 being the denser rubber are both integrally extruded with the core member 70 in a single extrusion process. Advantageously, the upper bodies 96, 97 of the bulbs 61, 62 are made of a material that is more flexible and elastic than the core member 70 and the base material 72 to more easily conform to the shape of the front end 21 of the roof member 22 for sealing the roof member 22.

Figure 3B:
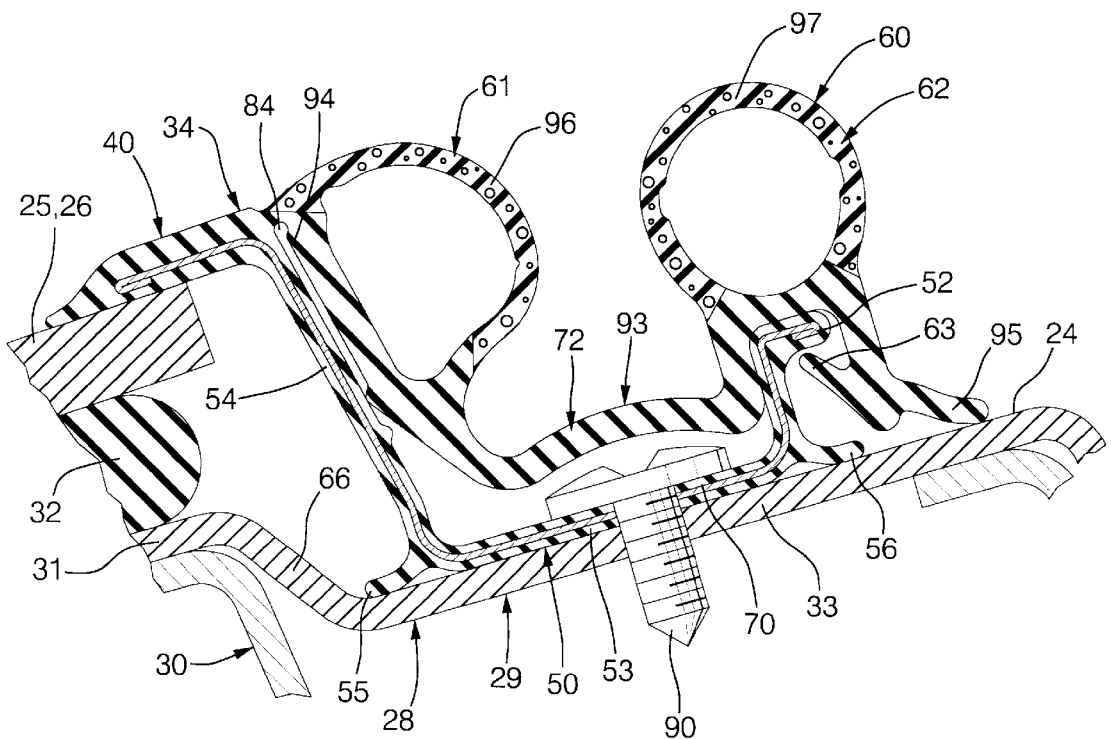
FIG. 3B is a cross-sectional view similar to FIG. 2, and showing the seal structure is the fully assembled condition, but with the removable roof member not installed on the vehicle.
Figure 4:
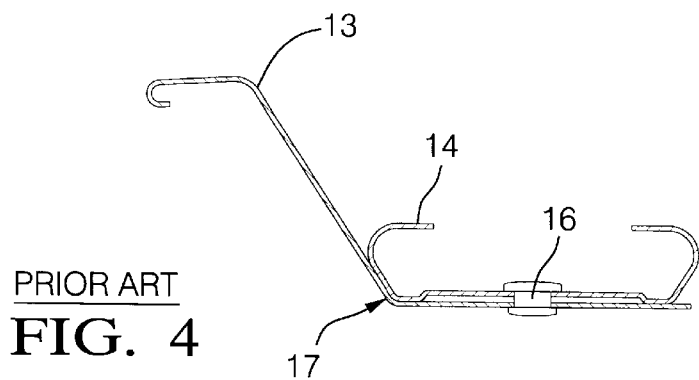
FIGS. 4–6 represent the assembly of a prior art sealing arrangement for a windshield and header with a removable roof member.
Figure 5:
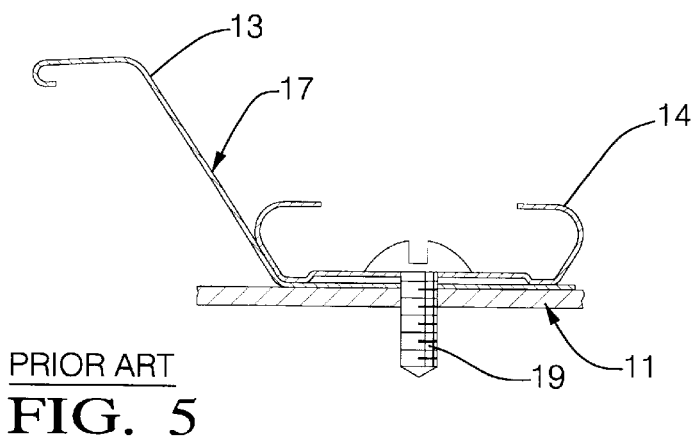
Figure 6:
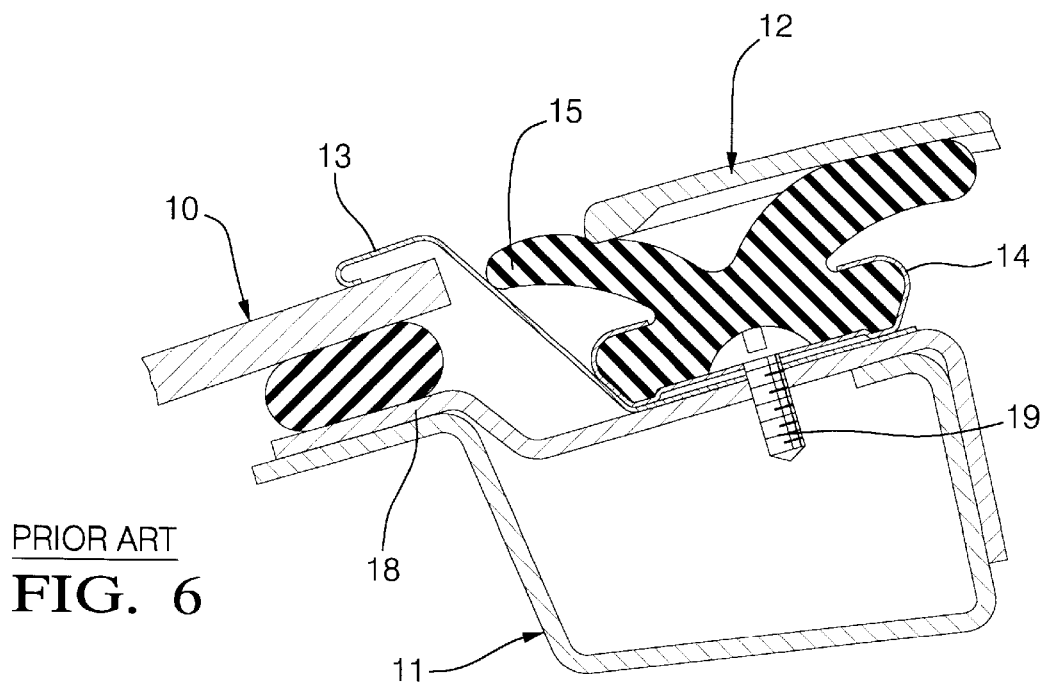

Referring to FIGS. 2, 3A and 3B, the seal structure 34 is assembled to the vehicle as follows. As best shown in FIG. 3A, the entire weatherstrip portion 60 can be rotated counterclockwise about the living hinge portion 84 to provide clear access to the lower leg portion 53 of the base retainer portion 50. Then the screws 90 can easily be inserted through both the lower leg portion 53 of the base retainer portion 50 and the upper rail 29 of the header rail 28. Advantageously, this securely attaches the entire seal structure 34 to the header rail 28. While the seal structure 34 is shown attached to the header rail 28 by the use of screws, it will be appreciated that the lower leg portion 53 of the base retainer portion 50 may be secured to the header rail 28 in any suitable manner. After the base retainer portion 50 is secured to the header rail 28, the weatherstrip portion 60 is rotated in a clockwise direction relative to FIGS. 3A and 3B until the finger portion 63 is snapped into engagement with the hook portion 52 along the entire lateral length of the seal structure 34 to complete assembly of the seal structure 34 to the vehicle 20.

Advantageously, the seal structure 34 is easily assembled to the vehicle 20 as a single integral component which reduces assembly time. Since the seal structure 34 is preferably handled as a single component during assembly and does not require any subassembly, adhesives and mechanical fasteners for subassembly of the seal structure 34 are eliminated. Advantageously, this seal structure 34 combines the distinct functions of a windshield reveal molding, a header weatherstrip retainer and a header weatherstrip into a single component. In addition, the seal structure 34 is relatively lightweight and easy to install on the vehicle 20. Also advantageously, the seal structure 34 is a single integral component such that potential leak paths between multiple components are eliminated.

It will be understood that a person skilled in the art may make modifications to the preferred embodiment shown herein within the scope and intent of the claims. For example, the header rail 28 could be any type of rail or any other structure that is used to support the windshield 26 and the roof member 22. It will also be appreciated that the header rail could also be a rear header rail and that the windshield could also be a rear windshield or backlight glass. It will also be appreciated that the removable roof member 22 can be any type of removable roof panels, convertible tops or targa tops which are sufficiently removable to provide an opening in the vehicle roof, even if they remain partially attached to the vehicle in some manner, such as by a hinging or sliding mechanism. Although the seal structure 34 preferably includes two different types of rubber materials, it will be appreciated that one or more than two rubber materials could be used. It will further be appreciated that while rubber is preferred, that any elastomeric or plastic material or any other material which is formable as a seal may be used. It will further be appreciated that while the core member 70 is preferably provided, the core member 70 could also be eliminated and a stiffer material used for the portions of the seal structure 34 which require a higher stiffness. While the weatherstrip portion 60 is shown as preferably including two bulbs 61, 62, it will further be appreciated that one bulb or more than two bulbs could also be utilized.

Figure 7:
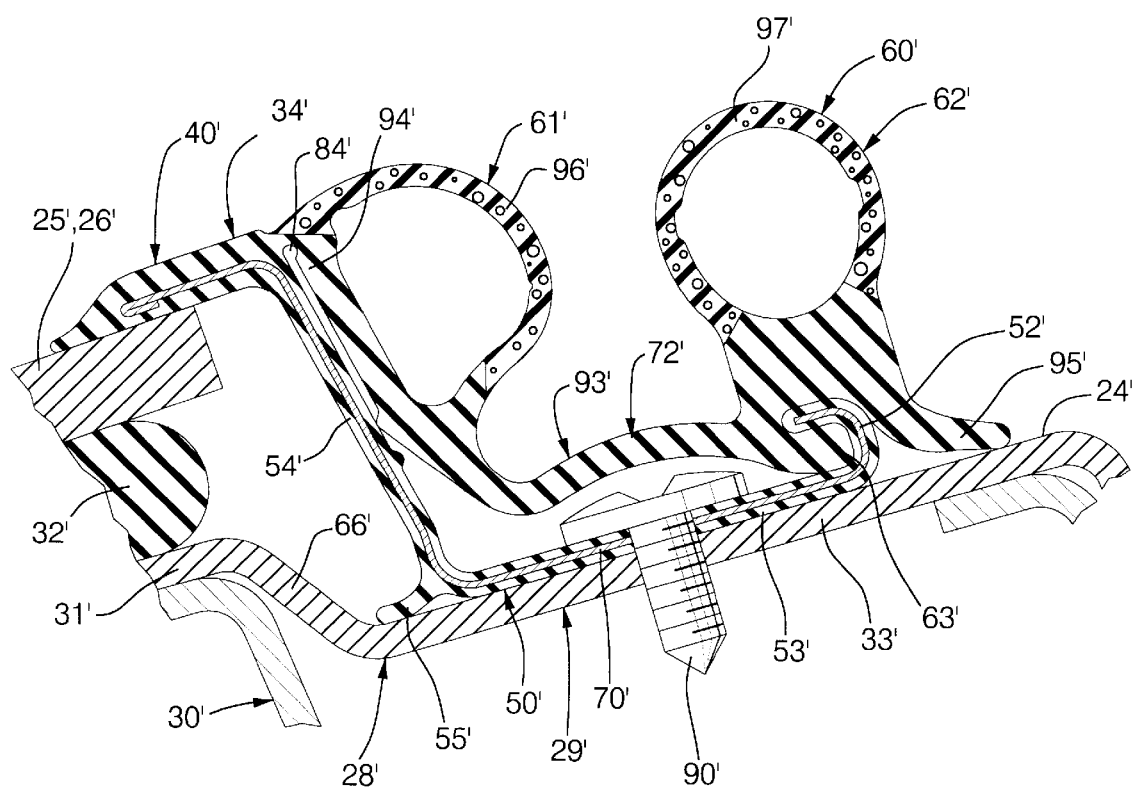
FIG. 7 is a cross-sectional view similar to FIG. 3B, but showing an alternate embodiment of the invention.

It will also be appreciated that the retaining finger portion 63 and the hook portion 52 may be any type of arrangement which permits a snap-fitted engagement of the weatherstrip portion 60 to the base retainer portion 50. For example, FIG. 7 shows an alternate embodiment similar to that of FIGS. 1–3B with similar features denoted by similar numerals having a prime added. All of the components have a description similar to the embodiment shown in FIGS. 1–3B, with the exception of the hook portion 52' and the finger portion 63'.

The base retainer portion 50' includes a hook portion 52' extending generally upward and forward from a rear edge of the lower leg portion 53' for retaining the weatherstrip portion 60'. The hook portion 52' is integrally formed with the base retainer portion 50' and the core member 70' is also embedded in the hook portion 52'. The hook portion 52' is bent in a forward direction in contrast to the hook portion 52 in FIGS. 1–3B which is bent in a rearward direction.

The arm portion 93' of the weatherstrip portion 60' includes a retaining finger portion 63' integrally extending from the arm portion 93' at about the forward edge of the rear weatherstrip bulb 62'. The finger portion 63' is positioned for snap-fitted engagement with the hook portion 52' of the base retainer portion 50' to hold the weatherstrip portion 60' in position relative to the base retainer portion 50'. The finger portion 63' is sized for being closely received within the hook portion 52'.

During assembly of the seal structure 34' to the vehicle, the lower leg portion 53' of the base retainer portion 50' is secured to the header rail 28' in any suitable manner. After the base retainer portion 50' is secured to the header rail 28', the weatherstrip portion 60' is rotated in a clockwise direction relative to FIG. 7 until the finger portion 63' is snapped into engagement with the hook portion 52' along the entire lateral length of the seal structure 34' to complete assembly of the seal structure 34' to the vehicle. Thus, it will be appreciated that there are many variations of the finger portion 63, 63' and hook portion 52 52' which may be used for snap-fitted engagement to hold the weatherstrip portion 60, 60' in position relative to the base retainer portion 50, 50'.

While the present invention has been described as carried out in specific embodiments thereof, it is not intended to be limited thereby but is intended to cover the invention broadly within the scope and spirit of the claims.

What is claimed is:

1. A seal structure for a vehicle having a removable roof member, the seal structure for sealing between a front end of the roof member, an upper edge of a windshield, and a header rail, the seal structure comprising:
    a base retainer portion for securement to the header rail;
    a windshield lip portion for covering and sealing against the upper edge of the windshield, the windshield lip portion being integrally coupled to the base retainer portion;
    a weatherstrip portion integrally coupled with the windshield lip portion and the base retainer portion, the weatherstrip portion for sealably engaging the front end of the roof member, the weatherstrip portion intersecting the windshield lip portion and the base retainer portion at a location between the upper edge of the windshield and the front end of the roof member when installed on the vehicle;
    a living hinge portion hingedly coupling the weatherstrip portion to the windshield lip portion at the intersection with the base retainer portion such that the weatherstrip portion is rotatable about the living hinge portion; and
    the base retainer portion including a generally upwardly projecting hook portion integrally formed therewith and wherein the weatherstrip portion includes a finger portion for matably engaging the hook portion by snap-fitted engagement to hold the weatherstrip in position relative to the base retainer portion.

2. The seal structure of claim 1 wherein the weatherstrip portion includes a hollow front weatherstrip bulb and a hollow rear weatherstrip bulb for sealably engaging the front end of the roof member and providing primary and secondary seals, respectively, against the roof member.

3. The seal structure of claim 2 wherein the weatherstrip portion includes an arm portion extending between and integrally connecting the front and rear weatherstrip bulbs.

4. The seal structure of claim 3 wherein the finger portion is integrally coupled to the arm portion.

5. The seal structure of claim 3 wherein the arm portion is made of a first material and wherein the bulbs are substantially made from a second material.

6. The seal structure of claim 1 wherein the weatherstrip portion includes at least one hollow weatherstrip bulb for sealably engaging the forward edge of the roof member.

7. The seal structure of claim 1 wherein a core member extends through and is integrally embedded in the base retainer portion and the windshield lip portion.

8. The seal structure of claim 7 wherein the weatherstrip portion includes a hollow front weatherstrip bulb and a hollow rear weatherstrip bulb for sealably engaging the forward end of the roof member and providing primary and secondary seals, respectively, against the roof member and wherein the weatherstrip portion includes an arm portion extending between and integrally connecting the front and rear weatherstrip bulbs and wherein the arm portion, windshield lip portion and base retainer portion are made of a first material and wherein the bulbs are substantially made from a second material and wherein the core member is made from a third material and wherein the third material is stiffer than the first material and wherein the first material is stiffer than the second material.

9. The seal structure of claim 1 wherein the base retainer portion and the windshield lip portion are made of a first material and wherein the weatherstrip is partially made of a second material.

10. The seal structure of claim 9 wherein a core member extends through and is integrally embedded in the first material of the base retainer portion and the windshield lip portion and wherein the core member is made of third material integrally extruded with the first and second materials.

11. A seal structure for a vehicle having a removable roof member, the seal structure for sealing between a front end of the roof member, an upper edge of a windshield, and a header rail, the seal structure comprising:
    a base retainer portion for securement to the header rail;
    a windshield lip portion for covering and sealing against the upper edge of the windshield, the windshield lip portion being integrally coupled to the base retainer portion;
    a weatherstrip portion integrally coupled with the windshield lip portion and the base retainer portion, and including a hollow front weatherstrip bulb and a hollow rear weatherstrip bulb for sealably engaging the front end of the roof member, and providing primary and secondary seals respectively, against the roof member, the weatherstrip portion intersecting the windshield lip portion and the base retainer portion at a location between the upper edge of the windshield and the front end of the roof member when installed on the vehicle;
    a living hinge portion hingedly coupling the weatherstrip portion to the windshield lip portion at the intersection with the base retainer portion such that the weatherstrip portion is rotatable about the living hinge portion and
    the weatherstrip portion including a lower arm portion extending between and integrally connecting the front and rear weatherstrip bulbs and wherein the arm portion is generally L-shaped and includes a forward tip portion integrally connected to the living hinge portion.

12. A seal structure for a vehicle having a removable roof member, the seal structure for sealing between a front end of the roof member, an upper edge of a windshield, and a header rail, the seal structure comprising:
    a base retainer portion for securement to the header rail;
    a windshield lip portion for covering and sealing against the upper edge of the windshield, the windshield lip portion being integrally coupled to the base retainer portion;
    a weatherstrip portion integrally coupled with the windshield lip portion and the base retainer portion, and including a hollow front weatherstrip bulb and a hollow rear weatherstrip bulb for sealably engaging the front end of the roof member, and providing primary and secondary seals respectively against the roof member, the weatherstrip portion intersecting the windshield lip portion and the base retainer portion at a location between the upper edge of the windshield and the front end of the roof member when installed on the vehicle;
    a living hinge portion hingedly coupling the weatherstrip portion to the windshield lip portion at the intersection with the base retainer portion such that the weatherstrip portion is rotatable about the living hinge portion; and the weatherstrip portion including a lower arm portion extending between and integrally connecting the front and rear weatherstrip bulbs and wherein the arm portion is generally L-shaped and extends between and integrally connects and closes the lower ends of the bulbs.

\* \* \* \* \*